United States Patent [19]
Ort et al.

[11] 3,955,207
[45] May 4, 1976

[54] CAMERA BELLOWS

[75] Inventors: Wolfgang Ort, Stuttgart-Bad Cannstatt; Heinz Streicher, Echterdingen; Gerhard Brauning; Günter Sachs, both of Ruit, all of Germany

[73] Assignee: Eastman Kodak Company, Rochester, N.Y.

[22] Filed: Apr. 10, 1975

[21] Appl. No.: 567,038

[30] Foreign Application Priority Data
Apr. 25, 1974 Germany............................ 2419986

[52] U.S. Cl. ................................................. 354/194
[51] Int. Cl.² ........................................ G03B 17/04
[58] Field of Search ........... 354/194, 192, 193, 281, 354/83, 85, 86, 155, 158, 187

[56] References Cited
UNITED STATES PATENTS

| | | | |
|---|---|---|---|
| 1,851,095 | 3/1932 | Gosselin............................. | 354/193 |
| 2,880,658 | 4/1959 | Land et al........................... | 354/85 |
| 2,906,182 | 9/1959 | Booth et al. ........................ | 354/86 |
| 3,677,160 | 7/1972 | Harvey................................ | 354/83 |
| 3,678,831 | 7/1972 | Baker.................................. | 354/155 |

*Primary Examiner*—Stephen J. Tomsky
*Attorney, Agent, or Firm*—T. H. Close

[57] ABSTRACT

In a photographic camera of the type having a box-like camera housing and a cover door having a main cover portion which is hinged at one end to the camera housing and a lens support portion on the other end of the main cover portion, a two-part light-tight bellows is provided which couples the cover door with the camera housing in a manner permitting movement of the cover door between a closed position wherein the main cover portion is substantially parallel to one wall of the camera housing and an open position wherein the main cover portion is extended outwardly from the housing at an oblique angle and the lens support portion is substantially parallel to the one wall of the camera housing. When the door is closed, the two-part bellows is collapsed with one part folded flat against the main cover portion of the door and the other part folded flat against the lens support portion of the cover door.

11 Claims, 6 Drawing Figures

CAMERA BELLOWS

BACKGROUND OF THE INVENTION

1. Field of the Invention

The present invention relates to photography and more particularly to bellows for folding type cameras.

2. Description of the Prior Art

Cameras having large film formats normally require a taking lens having a correspondingly long focal length. It is convenient if such cameras can be folded while not in use so as to occupy a minimum of storage space. It has long been known that bellows coupling the camera body and a lens assembly of such folding cameras provide a practical means for achieving a light-tight enclosure between the lens and the camera body.

In one known type of folding camera, the lens is supported at one end of a cover door that is hinged to the camera housing at its opposite end. A collapsible folding bellows allows the lens to be extended by opening the door to an oblique angle relative to the camera housing. In keeping the overall dimensions of the folded camera to a minimum, a major consideration has been the thickness and location within the camera of the folded bellows.

One approach has been to locate the folded bellows between the film plane and the cover door when the cover door is closed. To keep the overall thickness of the camera to a minimum, it is known to provide the bellows with just a single pleat. This arrangement is shown in U.S. Pat. No. 2,880,658. U.S. Pat. No. 1,851,095 shows a two-part bellows. The main part of the bellows has one pleat and folds flat between the cover door and the film plane. The second bellows part connects the main part of the bellows to the lens housing to enable the lens housing to be folded into the same plane as the cover door when the cover door is closed. In this arrangement, when the cover door is open and the lens housing is in a picture taking position, the second bellows part is collapsed.

Although the single pleated bellows take up a minimum of space when folded, they are very unstable and the lateral portions which pivot inwards are subjected to considerable strain in the regions where the pleat edges join, with the result that the bellows are subject to failure in these areas.

Bellows having several or many accordion-like pleats are more stable and tend to be more durable because they are subjected to less strain when folded. However, because of their construction they can be folded no thinner than the combined thickness of all the pleats. A camera of the type having a multi-pleated accordion-like bellows is shown in U.S. Pat. No. 2,906,182. In this camera, the front cover door has been hollowed out to receive the folded bellows with a consequent increase in the overall thickness of the camera. To minimize the overall thickness of the camera, it is known to employ a U-shaped accordion-pleated bellows that is stored, when the camera is closed, around three sides of a film pack. Such a camera is shown in U.S. Pat. No. 3,677,160. Since the U-shaped bellows surrounds the film pack on three sides, the overall thickness of the camera is minimized, but the width and length of the camera are increased by an amount sufficient to accommodate the folded bellows around the film pack.

Bellows of the kind which have multiple pleats for minimum strain and which fold flat between the camera cover and the film plane are known for use with a folding camera of the type in which the optical path is deflected to the negative material by a mirror. An example of this type of bellows is shown in U.S. Pat. No. 3,678,831. However, the deflection of the optical path results in a smaller pivot angle between the camera housing and the cover door and consequently a smaller bellows. Thus the smaller bellows can be folded relatively flat in a minimum of space. Such a bellows as described above is not, however, suitable for folding cameras which do not have optical path deflection, since in that case a larger pivot angle between the camera body and the cover is necessary. The number of pleats must be increased to produce a low-strain bellows in a camera without optical path deflection. Such a bellows would be thicker when folded, thus increasing the overall thickness of the camera.

SUMMARY OF THE INVENTION

The present invention relates to a bellows structure for a compact folding camera having a box-like housing that has an outward facing wall portion and a cover door that has a main cover portion with first and second ends and a lens support portion. The main cover portion is coupled at its first end to the lens support portion and at its second end to the housing. The cover door can be pivoted from an open position where the main cover portion projects outwardly from the housing to a closed position where the main cover portion lies substantially parallel with the wall portion. The bellows structure includes a first bellows portion that is coupled to the housing and the main cover portion and forms with the main cover portion a substantially wedge shaped enclosure when the cover door is in its open position. A second bellows portion couples the first bellows portion and the lens support portion and forms a substantially pyramidal enclosure when the cover door is open.

When the cover door is closed, the first bellows portion is collapsed flat against the main cover portion and the second bellows portion is collapsed flat against the lens support portion.

In the preferred embodiment of the invention, the first bellows portion includes a plurality of pleats that are foldable in a fan-like manner about a point substantially coincident with the second end of the main cover portion. The pleats are of various widths so that when the bellows is collapsed, the folds of the pleats do not lie upon one another thereby minimizing the overall thickness of the folded first portion of the bellows.

DESCRIPTION OF THE PREFERRED EMBODIMENT

Figure 3:
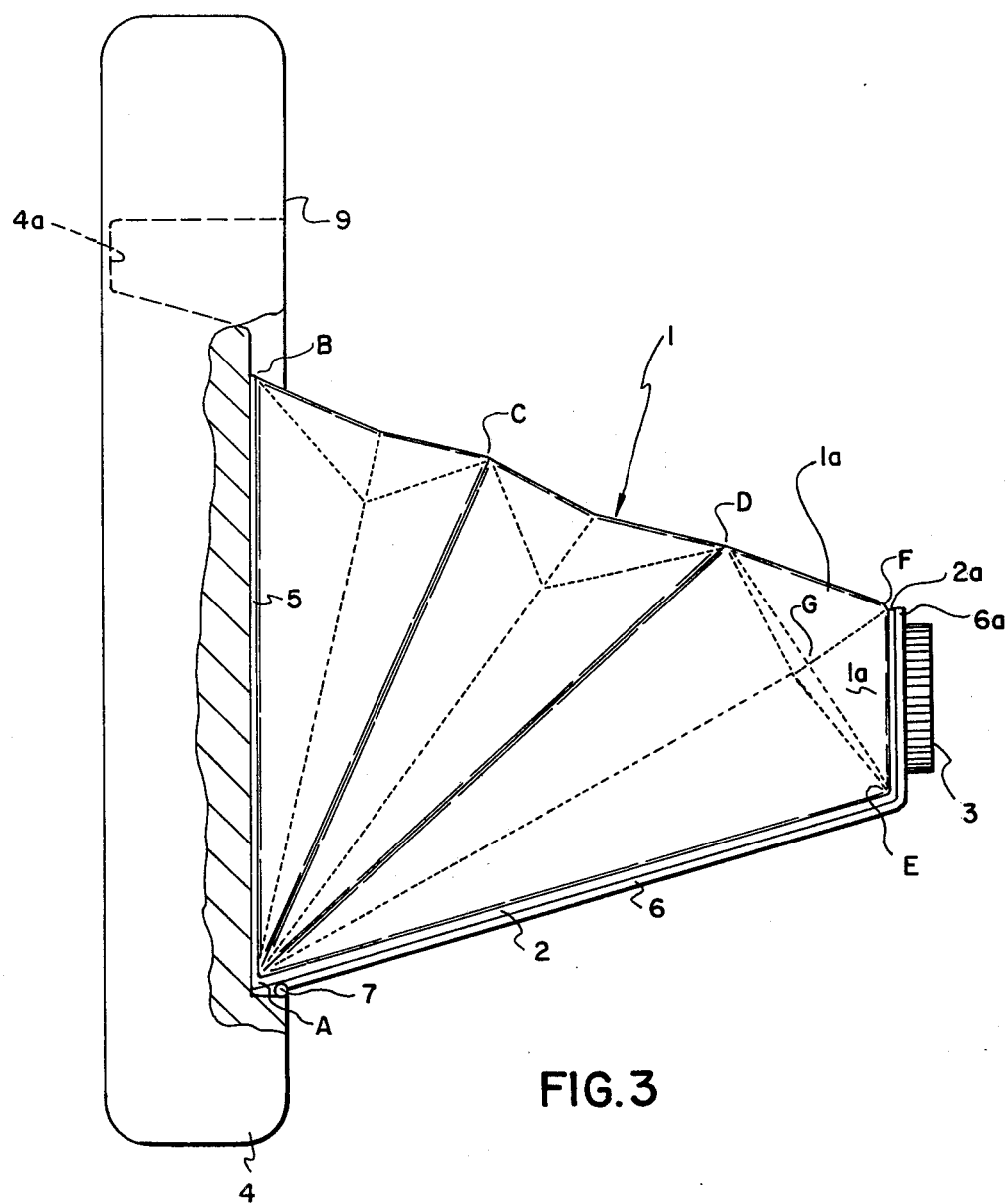
FIG. 3 is a side view of a folding camera having a bellows according to the present invention. The camera is shown in an open condition.
Figure 4:
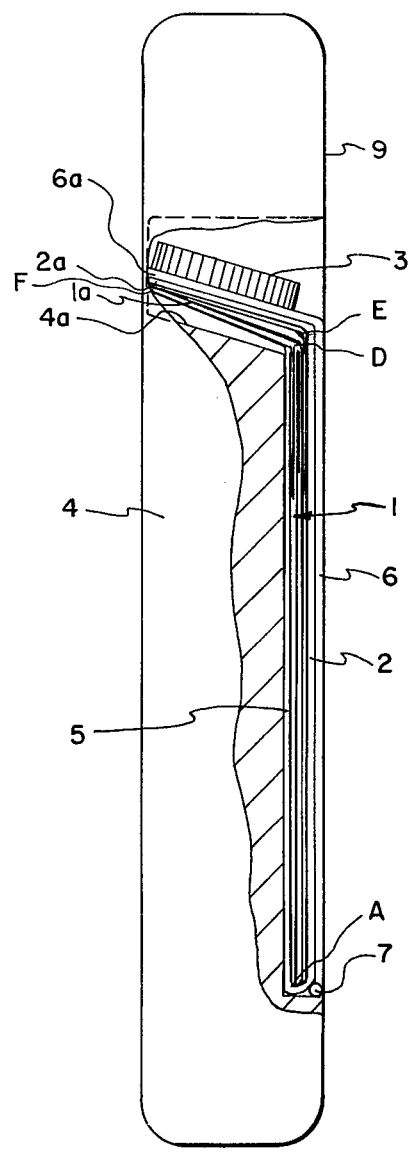
FIG. 4 corresponds to FIG. 3, showing the camera in a closed condition.

Reference is now made to FIG. 3 wherein a box-like camera housing 4 is depicted having a cover door with a main cover portion 6 coupled to the front wall 9 of the housing by a hinge 7. A camera lens 3 and a shutter (not shown) are carried by a lens support portion 6a of the cover door. The cover door can be moved on its hinge between an open position as shown in FIG. 3 to a closed position as shown in FIG. 4. When the cover door is closed, it is substantially flush with the front wall 9 of the camera housing. The relatively small size of the closed camera makes it convenient to carry and store.

From FIG. 3 it can be seen that the cover door 6 is coupled to the camera housing by a light-tight bellows 1 which will be described in greater detail below. The bellows is secured to the cover door by means of a rigid holding sheet having a first portion 2 corresponding to the main cover portion of the cover door and a second portion 2a corresponding to the lens support portion of the cover door. The bellows is attached to the rigid holding sheet by means of adhesion or heat sealing. The bellows is secured to the camera housing 4 by means of a frame 5 which is likewise connected to the bellows by adhesion or heat sealing.

Figure 1:
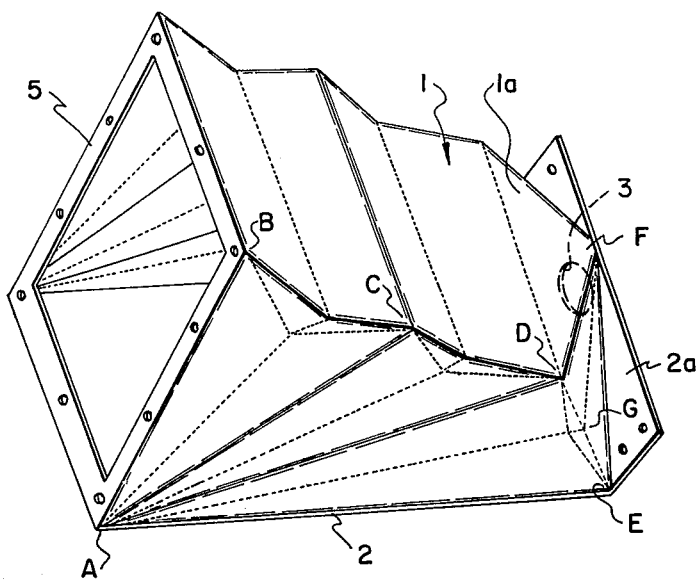
FIG. 1 is a perspective view of a bellows according to the present invention, the bellows being in an open condition.

The bellows construction itself will now be described in greater detail with reference to FIG. 1. The collapsible bellows 1 is formed of two parts. When open, the first part of the bellows describes a generally wedge-shaped enclosure with the first portion of the holding sheet 2 as one side of the wedge. The points A-B-C-D-E-A denote a boundary of one side of the first part of the bellows. This first bellows part has three pleated segments denoted by the points A-B-C, A-C-D, and A-D-E which are pivoted about the point A in the manner of a fan for folding. The dotted lines represent inward folding pleat edges and the solid lines represent outward folding pleat edges.

The second part of the bellows, when open, describes a generally pyramidal enclosure with the second portion 2a of the holding sheet forming one face of the pyramid. The points D-E-F-D denote a side face of the pyramid. This second part of the bellows has pleats with folds occurring on opposite side faces only. The edges of the second part of the bellows which correspond to the perimetric edges of the base of the pyramid join the top edges of the first bellows part to complete the light-tight enclosure.

The inward folding pleat edges of the second bellows part are met by the inward folding pleat edges of the segment A-D-E of the first bellows part at point G. The edges D-F and E-F of the second bellows part are of equal length.

Figure 2:
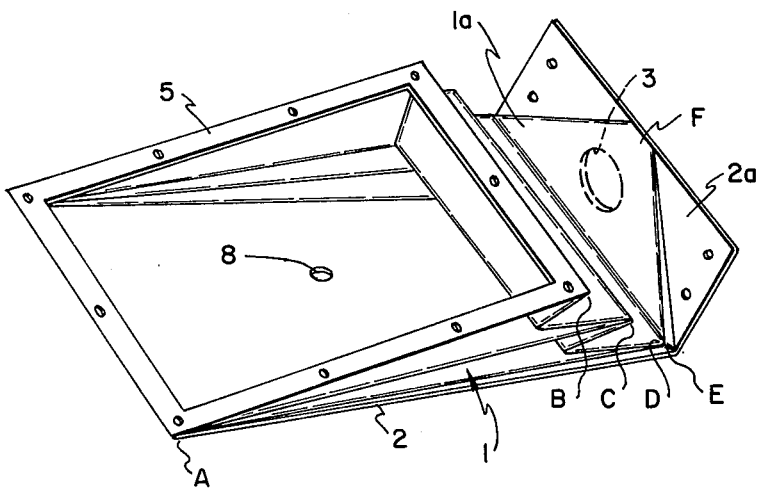
FIG. 2 corresponds to FIG. 1, showing the bellows in a partially closed condition.

As can be seen from FIG. 2, illustrating the bellows in a partially collapsed condition, the pleats in the first bellows section are of varying widths so that the folds are staggered when the bellows is collapsed, thereby insuring the most compact configuration when collapsed.

Referring now to FIG. 3, it can be seen that when the cover door is open in its picture taking condition, both bellows parts are in their fully open positions.

When the cover door is closed as shown in FIG. 4, the pleat segments A-B-C, A-C-D, and A-D-E of the first part of the bellows fold up like a fan pivoting around the point A and rest flat against the main cover portion 6 of the cover door. The second part of the bellows collapses about point F corresponding to the tip of the pyramid. The pleat edges D come to rest adjacent to point E.

The taking lens 3 is shown stored in a recess 4a when the camera is closed. Alternatively, the lens support portion 6a of the cover door can be hinged so that when opened, the lens support portion, controlled by linkage not shown, would assume an angular position with respect to the main portion of the door, and when closed would assume an extended position substantially coplanar with the main portion of the cover door, coming to rest on the external surface of the camera rather than in the interior thereof.

Although the bellows 1 can be folded extremely flat and assume an almost fully extended form when open, it is not subjected to high tensile stress in either the open or closed condition.

Figure 5:
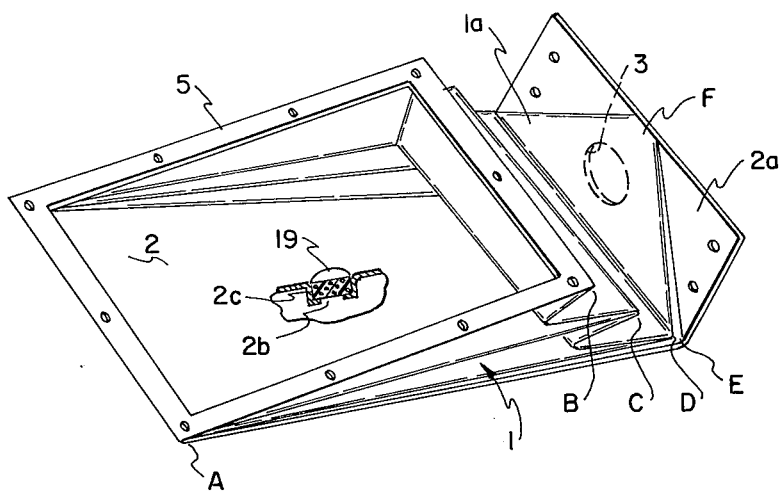
FIG. 5 shows the bellows of FIG. 2 with a means for venting the bellows to the outside air.

Returning now to FIG. 2, air entering the bellows when the camera is opened and exiting from the bellows when the camera is closed in conducted through an opening 8 in the holding sheet 2. To keep dust from entering the interior of the bellows, the opening can be provided with a covering of suitably porous opaque material that will trap dust and allow air to enter and exit. Such an arrangement is shown in FIG. 5, wherein a disc of porous material 19 is inserted and held in a recess 2c formed in the holding sheet. A hole 2b in recess 2c allows air to pass through the porous material. A corresponding opening in the cover door 6 could be provided to allow air to pass through the cover door.

Figure 6:
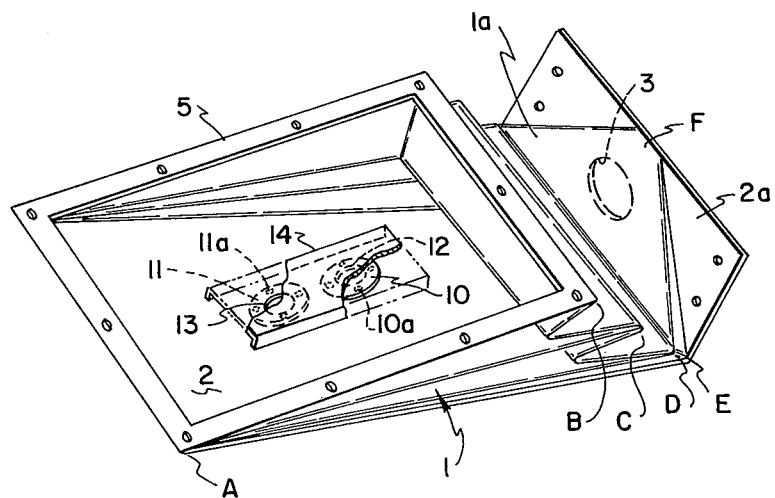
FIG. 6 corresponds to FIG. 5, showing an alternative means of venting the bellows.

Alternatively, as shown in FIG. 6, the arrangement for the passage of air to and from the bellows could comprise two diaphragm valves 10 and 11 covering holes 12 and 13, the valves being effective in opposite directions. Each of these diaphragm valves 10 and 11 is composed of a resilient plate made of rubber, plastic, or another suitable material which is attached to the holding sheet 2 at several points, such as 10a or 11a around its periphery by means of adhesion or heat sealing. In order that the diaphragm valves may be effective in opposite directions, they are arranged on opposite sides of the holding sheet. The valve openings are covered by a bonnet 14 which is fastened to the holding sheet 2, to prevent light from entering the bellows when the valves are open.

When the camera is opened, a partial vacuum is created inside the bellows, and the diaphragm valve 10 located inside the bellows is lifted slightly by the outside air pressure so that the outside air can flow in through the hole 12.

When the camera is closed, excess pressure inside the bellows causes diaphragm valve 11, located on the other side of holding sheet 2, to be lifted, allowing air in the bellows to escape through the hole 13. When the camera is not being opened or closed, the diaphragm valves 10 and 11 lie against the holding sheet 2, thereby preventing dust from entering the bellows.

The invention has been described in detail with particular reference to the preferred embodiment thereof, but it will be understood that variations and modifications can be effected within the spirit and scope of the invention.

We claim:

1. In a camera having a box-like housing including an outward facing wall portion and a cover door including a main cover portion having first and second ends and a lens support portion, the main cover portion being coupled at its first end to the lens support portion and at its second end to the housing to provide for pivotal movement of the cover door from an open position wherein the main cover portion projects outwardly from the housing to a closed position wherein the main cover portion lies substantially parallel with the wall portion, a collapsible bellows comprising:
- a first bellows portion coupled to the housing and the main cover portion, said first bellows portion forming with the main cover portion a substantially wedge-shaped enclosure when the cover door is in its open position, said first bellows portion lying substantially flat against the main cover portion when the cover door is in its closed position; and
- a second bellows portion coupled to said first bellows portion and the lens support portion, said second bellows portion forming with the lens support portion a substantially pyramidal enclosure when the cover door is in its open position, said second bellows portion lying substantially flat against the lens support portion when the cover door is in its closed position.

2. The bellows claimed in claim 1 wherein said first bellows portion includes a plurality of pleats that are foldable in a fan-like manner about a point substantially coincident with the second end in response to said pivotal movement of the cover door.

3. The bellows claimed in claim 2 wherein said pleats, when folded, define folds of unequal widths.

4. The bellows claimed in claim 3 wherein said widths increase as said folds extend farther from the second end.

5. The bellows claimed in claim 1 wherein said first bellows portion includes a plurality of U-shaped pleat segments having triangular side sections that are foldable inwardly of said first bellows portion in response to said pivotal movement of the cover door.

6. The bellows claimed in claim 1 wherein said pyramidal enclosure includes a base defining perimetric edges, and wherein said second bellows portion is coupled to said first bellows portion along said edges.

7. The bellows claimed in claim 1 wherein said pyramidal enclosure includes a tip, and wherein said second bellows portion is collapsible about a hinge point that substantially corresponds to said tip in response to said pivotal movement of the cover door.

8. The bellows claimed in claim 7 wherein said second bellows portion includes sides defining two symmetrically arranged triangular portions that are foldable inwardly of said second bellows portion in response to said pivotal movement of the cover door.

9. The bellows claimed in claim 1 further comprising a holding sheet coupled to said first and second bellows portions and the cover door.

10. The bellows claimed in claim 9 wherein said holding sheet includes a first portion coupled to the main cover portion and said first bellows portion, and a second portion coupled to the lens holding portion and said second bellows portion.

11. The bellows claimed in claim 1 further comprising a frame coupled to said first bellows portion and the housing.

* * * * *